United States Patent
McFarlane (10) Patent No.: US 11,518,098 B2
(45) Date of Patent: Dec. 6, 2022

(54) DIVIDED RESIN CASSETTES FOR ENHANCED WORK FLOW IN ADDITIVE MANUFACTURING OF DENTAL PRODUCTS AND THE LIKE

(71) Applicant: Carbon, Inc., Redwood City, CA (US)

(72) Inventor: Iain A. McFarlane, Monterey, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/597,656

(22) PCT Filed: Jul. 14, 2020

(86) PCT No.: PCT/US2020/041873
§ 371 (c)(1),
(2) Date: Jan. 17, 2022

(87) PCT Pub. No.: WO2021/040898
PCT Pub. Date: Mar. 4, 2021

(65) Prior Publication Data
US 2022/0258421 A1 Aug. 18, 2022

Related U.S. Application Data

(60) Provisional application No. 62/893,870, filed on Aug. 30, 2019.

(51) Int. Cl.
*B29C 64/259* (2017.01)
*B29C 64/124* (2017.01)
(Continued)

(52) U.S. Cl.
CPC ........ *B29C 64/259* (2017.08); *A61C 13/0019* (2013.01); *B29C 64/124* (2017.08);
(Continued)

(58) Field of Classification Search
CPC ........................... B29C 64/255; B29C 64/259
See application file for complete search history.

(56) References Cited

U.S. PATENT DOCUMENTS 5,236,637 A   8/1993   Hull
5,391,072 A   2/1995   Lawton et al.
(Continued)

FOREIGN PATENT DOCUMENTS

DE   102007010624 A1 *   9/2008   ......... B29C 67/0055
KR      101848859 B1      5/2018
(Continued)

OTHER PUBLICATIONS

International Search Report and Written Opinion corresponding to International Patent Application No. PCT/US2020/041873, dated Oct. 30, 2020.
(Continued)

*Primary Examiner* — Timothy Kennedy
(74) *Attorney, Agent, or Firm* — Myers Bigel, P.A.

(57) ABSTRACT

The present disclosure describes a resin cassette for an additive manufacturing apparatus. The resin cassette includes a light-transmissive window, a frame connected to and surrounding the window, and at least one dame connected to the frame. The frame and window form a well for receiving a light polymerizable resin. The dam extends over and continuously contacts the window and partitions the well into a plurality of independent build regions, each independent build region configured for receiving different light polymerizable resins. Additive manufacturing apparatuses and methods of concurrently making three-dimensional objects are also described.

15 Claims, 6 Drawing Sheets

(51) Int. Cl.
  *B29C 64/171* (2017.01)
  *B29C 64/245* (2017.01)
  *B29C 64/227* (2017.01)
  *A61C 13/00* (2006.01)
  *B33Y 10/00* (2015.01)
  *B33Y 30/00* (2015.01)
  *B33Y 40/00* (2020.01)
  *B33Y 80/00* (2015.01)
  *B29L 31/00* (2006.01)

(52) U.S. Cl.
  CPC .......... *B29C 64/171* (2017.08); *B29C 64/227* (2017.08); *B29C 64/245* (2017.08); *B29L 2031/7536* (2013.01); *B33Y 10/00* (2014.12); *B33Y 30/00* (2014.12); *B33Y 40/00* (2014.12); *B33Y 80/00* (2014.12)

(56) References Cited

U.S. PATENT DOCUMENTS

| | | | |
|---|---|---|---|
| 5,529,473 A | 6/1996 | Lawton et al. | |
| 7,438,846 B2 | 10/2008 | John | |
| 7,892,474 B2 | 2/2011 | Shkolnik et al. | |
| 8,110,135 B2 | 2/2012 | El-Siblani | |
| 8,535,779 B1 | 9/2013 | Varanasi et al. | |
| 8,574,704 B2 | 11/2013 | Smith et al. | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,360,757 B2 | 6/2016 | Desimone et al. | |
| 9,453,142 B2 | 9/2016 | Rolland et al. | |
| 9,498,920 B2 | 11/2016 | Desimone et al. | |
| 9,598,606 B2 | 3/2017 | Rolland et al. | |
| 9,676,963 B2 | 6/2017 | Rolland et al. | |
| 2012/0195994 A1 | 8/2012 | El-Siblani et al. | |
| 2013/0292862 A1 | 11/2013 | Joyce | |
| 2013/0295212 A1 | 11/2013 | Chen et al. | |
| 2014/0290478 A1 | 10/2014 | Liu et al. | |
| 2016/0046075 A1 | 2/2016 | Desimone et al. | |
| 2016/0193786 A1 | 7/2016 | Moore et al. | |
| 2016/0200052 A1 | 7/2016 | Moore et al. | |
| 2017/0129169 A1 | 5/2017 | Batchelder et al. | |
| 2017/0182708 A1* | 6/2017 | Lin | B33Y 10/00 |
| 2019/0126536 A1 | 5/2019 | Thompson | |
| 2022/0258420 A1* | 8/2022 | Märklin | A61C 13/0019 |

FOREIGN PATENT DOCUMENTS

| | | |
|---|---|---|
| WO | 2015195924 A1 | 12/2015 |
| WO | 2016007495 A1 | 1/2016 |
| WO | 2016123499 A1 | 8/2016 |
| WO | 2016123506 A1 | 8/2016 |
| WO | 2016140886 A1 | 9/2016 |
| WO | 2016149014 A1 | 9/2016 |
| WO | 2016149097 A1 | 9/2016 |

OTHER PUBLICATIONS

Janusziewicz, Rima, et al., "Layerless fabrication with continuous liquid interface production", PNAS, 113, 2016, 11703-11708.
Tumbleston, John R., et al., "Continuous liquid interface production of 3D Objects", Science, 347(6228), 2015, 1349-1352.

* cited by examiner

DIVIDED RESIN CASSETTES FOR ENHANCED WORK FLOW IN ADDITIVE MANUFACTURING OF DENTAL PRODUCTS AND THE LIKE

CROSS REFERENCE TO RELATED APPLICATIONS

The present application is a 35 U.S.C. § 371 national phase application of International Application Serial No. PCT/US2020/041873, filed Jul. 14, 2020, which claims priority from and the benefit of U.S. Provisional Application Ser. No. 62/893,870, filed Aug. 30, 2019, the disclosure of which is hereby incorporated herein in its entirety.

FIELD OF THE INVENTION

The present invention concerns additive manufacturing, and more particularly apparatuses and methods for additively manufacturing distinct three-dimensional objects utilizing different polymerizable resins simultaneously.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top-down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678, 9,205,601, and 9,216,546 to DeSimone et al.; and also J. Tumbleston, D. Shirvanyants, N. Ermoshkin et al., Continuous liquid interface production of 3D Objects, Science 347, 1349-1352 (2015); see also Rolland et al., U.S. Pat. Nos. 9,676,963, 9,453,142 and 9,598,606.

SUMMARY OF THE INVENTION

In some embodiments, a resin cassette for an additive manufacturing apparatus includes a light-transmissive window, a frame connected to and surrounding the window, and at least one dame connected to the frame. The frame and the window define a well for one or more light polymerizable resins. The at least one dam may extend over the window, and may continuously contact the window. The at least one dam may partition the well into a plurality of independent build regions. Each independent build region may be configured for receiving different light polymerizable resins from one another.

In some embodiments, the at least one dam is removably connected to or permanently fixed to said frame.

In some embodiments, the independent build regions are symmetric or asymmetric.

In some embodiments, the plurality of independent build regions consists of from two or three to six or eight independent build regions.

In some embodiments, the at least one dam includes opposing sidewall portions and a bottom portion, the bottom portion having a resilient gasket connected thereto, the gasket configured for sealing the at least one dam to the window.

In some embodiments, each sidewall portion has a plurality of recesses formed therein, the recesses configured to receive light polymerizable resin therein and facilitate the flow of resin onto the window therefrom, with the recesses of each sidewall portion interleaved with the recesses of the opposing sidewall portion.

In some embodiments, an additive manufacturing apparatus includes a deck, a resin cassette positioned on the deck, a light engine positioned beneath the deck and configured for projecting light through the light-transmissive window, a drive assembly operatively associated with the deck, and a carrier platform connected to the drive assembly and positioned above the resin cassette. The carrier platform may have at least one channel formed therein, the at least one channel configured to received the at least one dam when the carrier platform and the light-transmissive window are advanced towards one another such that the carrier platform is partitioned into a plurality of independent build surfaces corresponding to the plurality of independent build regions.

In some embodiments, the carrier platform includes a plurality of independently addressable, removable or retractable, build segments configured such that the at least one channel is adjustable to correspond to the position of the at least one dam.

In some embodiments, a method of concurrently making a plurality of three-dimensional objects from a plurality of distinct light polymerizable resins includes (a) filling at least two build regions of an additive manufacturing apparatus with a different resin in each build region; and then (b) concurrently producing at least one object from each of the resins on each of the independent build surfaces.

In some embodiments, the three-dimensional objects include (i) dental crowns, dental bridges, or a combination thereof, (ii) denture bases, or (iii) a combination of (i) and (ii).

In some embodiments, the three-dimensional objects include dental appliances selected from a group consisting of dental crowns, dental bridges, denture bases, denture teeth in single unit or bridged construction, implant retained/implant supported bars and superstructures, partial denture frameworks, night guards and splints, and any associated dental models or ancillary components such as surgical guides, soft tissue models, implant abutment replicas, custom trays.

In some embodiments, the different resins differ from one another in pigment content, the different resins are like one another in monomer and/or prepolymer content, and optionally, but in some embodiments preferably, the different resins are like one another in catalyst and/or filler content.

In some embodiments, a plurality of dental crowns and/or bridges are produced in each build region, and the dental crowns and/or bridges of each build region differ from those of the other build region in pigment content.

In some embodiments, the apparatus further includes a controller operatively associated with the light engine and the drive assembly. In some embodiments, method further includes identifying the position of the at least one dam and/or the plurality of independent build regions in the frame.

In some embodiments, at least one of the different resins has a dose to cure (DC) different from the others of the different resins, and the controller is configured to modify the light dose to at least one of build region based on the different DC for the resin in that build region.

In some embodiments, a set of three-dimensional objects defined by at least one print file is produced in each of the independent build regions. In some embodiments, the method further includes independently saving the at least one print file associated with each of the independent build regions.

In some embodiments, the method further includes providing a data file for a plurality of objects, each of the plurality of objects having a unique identifier indicating which of the different resins should be used to produce each three-dimensional object; and then assigning each the three-dimensional object.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Additive Manufacturing Methods and Apparatus.

Additive manufacturing apparatus and methods are known. Suitable apparatus includes bottom-up apparatus that employ a window, or optically transparent member or "build plate," on which a pool of polymerizable liquid sits, and through which patterned light is projected to produce a three-dimensional object. Such methods and apparatus are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and U.S. Patent Application Publication No. 2013/0295212 to Chen et al. The disclosures of these patents and applications are incorporated by reference herein in their entirety.

CLIP is known and described in, for example, U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the the irradiating and/or the advancing steps are carried out while also concurrently maintaining a stable or persistent liquid interface between the growing object and the build surface or window, such as by: (i) continuously maintaining a dead zone of polymerizable liquid in contact with the build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. The particular manner of description is not critical, and the present invention can be used in any of a variety of systems that employ a semipermeable build plate, through which an inhibitor of polymerization passes, whether explicitly referred to as "CLIP" or not.

The apparatus can include a local controller that contains and executes operating instructions for the production of a three-dimensional object on that apparatus, typically from an object data file entered into the controller by the user. Along with the basic three-dimensional image of the object that is typically projected for photopolymerization (along with movement of the carrier and build surface away from one another in the Z direction), the operating instructions can include or generate process parameters such as: light intensity; light exposure duration; inter-exposure duration; speed of production; step height; height and/or duration of upstroke in a stepped or reciprocal operating mode; height and/or duration of downstroke in a reciprocal operating mode; rotation speed for pumping viscous polymerizable liquid; resin heating temperature; and/or resin cooling temperature; rotation speed and frequency, etc. (see, e.g., Ermoshkin et al., *Three-dimensional printing with reciprocal feeding of polymerizable liquid* PCT Patent Application Publication No. WO 2015/195924 (published 23 Dec. 2015); Sutter et al., *Fabrication of three dimensional objects with multiple operating modes*, PCT Patent Application Publication No. WO 2016/140886 (published 9 Sep. 2016); J. DeSimone et al., *Methods and apparatus for continuous liquid interface production with rotation*, PCT Patent Application WO 2016/007495 (published 14 Jan. 2016); see also J. DeSimone et al., U.S. Pat. No. 9,211,678, and J. Batchelder et al., *Continuous liquid interface production system with viscosity* pump, U.S. Patent Application Publication No. US 2017/0129169 (published 11 May 2017).

In one non-limiting embodiment, the apparatus may be a Carbon Inc., M1 or M2 additive manufacturing apparatus, available from Carbon, Inc., 1089 Mills Way, Redwood City, Calif. 94063 USA.

In some embodiments, the resin is a dual cure resin, such as a resin comprising at least one light polymerizable constituent, and at least one heat polymerizable constituent (that is a constituent different from the light polymerizable constituent). Such resins are described in, for example, Rolland et al., U.S. Pat. Nos. 9,676,963; 9,598,606; and 9,453,142, the disclosures of which are incorporated herein by reference.

Resins may be in any suitable form, including "one pot" resins and "dual precursor" resins (where cross-reactive constituents are packaged separately and mixed together before use, and which may be identified as an "A" precursor resin and a "B" precursor resin).

Particular examples of suitable resins include, but are not limited to, Carbon, Inc. rigid polyurethane resin (RPU), flexible polyurethane resin (FPU), elastomeric polyurethane resin (EPU), cyanate ester resin (CE), or epoxy resin (EPX), all available from Carbon, Inc., 1089 Mills Way, Redwood City, Calif. 94063 USA.

2. Window Cassettes.

In general, a window cassette or build plate for use in the present invention may comprise any suitable semipermeable or permeable material (that is, permeable to the polymerization inhibitor) including amorphous fluoropolymers, such as an amorphous thermoplastic fluoropolymer like TEFLON AF 1600™ or TEFLON AF 2400™ fluoropolymer films, or perfluoropolyether (PFPE), particularly a crosslinked PFPE film, or a crosslinked silicone polymer film. Beneath that may be a fluid bed layer, such as provided by a gas permeable material, optionally containing channels or cavities, such as a permeable polymer (e.g., poly(dimethylsiloxane) (PDMS). A base or support member (such as glass or sapphire) may be included at the bottom of the window if necessary, and may serve to further define the fluid supply bed. The build plate may be supported by a peripheral frame, with the two together forming a removable window cassette as discussed below.

In some embodiments, the pressure and gas supply to the build plate may be controlled to reduce bubble or voids formed by excess gasses, such as nitrogen, in the polymerizable fluid (e.g., resin) of in the 3D printing process and apparatus. Although the methods described herein may be performed by controlling a pressure and/or content of the gas supplied to the build plate using a pressure controller/gas supply, it should be understood that any suitable system may be used, including alternative build plates. For example, any permeable build plate may be positioned such that the side opposite the build surface is in a pressure-controlled chamber, or any suitable configuration of pressure-pressure controlled channels may be used.

The amount and duration of the reduced pressure applied to the polymerizable liquid through the optically transparent member is preferably sufficient to reduce a gas concentration in the polymerizable liquid. The pressure may be at 0%, 5%, 10%, 20%, 25%, 30%, 40% to 50%, 60%, 70%, 80%, 90% or 100% of atmospheric pressure. The oxygen or polymerization inhibitor gas composition of the gas supplied may be 20%, 25%, 30%, 40% to 50%, 60%, 70%, 80%, 90% or 100% oxygen.

In some embodiments, the polymerizable fluid has a gradient of gas concentration, which determines an amount of irradiation or "dose" to cure the polymerizable liquid. For example, the polymerizable fluid can have a lower region on the optically transparent member and an upper region on the lower region opposite the optically transparent member such that the lower region has a higher dose to cure than the upper region. The applied reduced pressure to the polymerizable liquid through the optically transparent member may reduce a gas concentration in the upper region, while maintaining the polymerization inhibitor gas in the lower region, which consequently reduces a thickness of the dead zone. In some embodiments, the thickness of the lower region is less than about 1000 microns or between about 1, 2, 5, 10, 20 50, 100, 200 300 to 400, 500, 600, 700, 800, 900 or 1000 microns.

In some embodiments, oxygen gas may be used as the polymerization inhibitor. Oxygen may be supplied at any suitable pressure, and is preferably supplied at a pressure that is less than atmospheric pressure. In particular embodiments, the pressure of the oxygen is substantial equal to a partial pressure of oxygen in air at atmospheric pressure (e.g., 100% oxygen supplied at about 0.2 atm). The polymerization inhibitor gas may also be substantially devoid of nitrogen or other gases that do not substantially contribute to polymerization inhibition in the dead zone.

Without wishing to be bound by any particular theory, resins that are saturated with gas are prone to degassing when the local pressure drops. Large pressure drops can occur during the build platform movement and resin refill. When the separation of the printed part and window result in gas coalescence, voids may be formed in the printed part. Accordingly, controlling the pressure of a gas or applying a vacuum through the gas permeable build plate may reduce the level of dissolved gases prior to the pressure change and reducing an amount of dissolved gas may increase the pressure differential that the resin can experience prior to void formation. The build plate is permeable to gasses, and equilibrium may be established at the build plate/resin interface relatively quickly. Cycling between air (or oxygen) and vacuum for printing formation and part movement, respectively, may permit the CLIP process to be performed with a maximum pressure differential on the resin prior to void formation the part. Moreover, the removal of nitrogen, which is not an active component of polymerization inhibition, may reduce the overall gas level and further reduce the formation of bubbles or voids in the printed part.

In addition, while oxygen delivery to the interface between the polymerizable fluid and the build plate is desirable, oxygen in the regions of the polymerization fluid that are further away from the interface may lead to a larger dosage of irradiation to cure the polymerizable fluid, which results in a longer exposure time and slower print speeds. Reducing the overall oxygen level may lead to faster cure times, by may lead to difficulty maintaining sufficient oxygen at the interface for the CLIP process to be effective. Moreover, since the light intensity decays as it passes through the polymerization fluid, the percent monomer to polymer conversions may not be constant throughout the exposed region. Controlling a level of oxygen concentration may reduce exposure times and increase print speeds by effectively maintaining a level of oxygen at the build plate and polymerization fluid interface. The oxygen concentration profile may also be controlled to provide more consistent percent monomer to polymer conversions in view of variations of light intensity.

Additional Build Plate Materials. Any suitable material may be used to form the build plates described herein, including multi-layer build plates and/or build plates formed of more than one material. For example, the flexible layer (used alone or with additional supports or layers) may include a woven glass fabric (fiberglass or e-glass) with a crosslinked silicone elastomeric coating (such as room temperature vulcanized (RTV) silicone), which may be lightly infiltrated into the glass fiber fabric to provide mechanical durability. The oxygen permeability of silicone elastomer (rubber) is similar to Teflon® AF-2400. Such a configuration may be used alone or affixed (adhesively adhered) to a glass plate with the unfilled areas of the fabric available for air (oxygen) flow. Sulfonated tetrafluoroethylene based fluoropolymer-copolymers, such as Nafion® from Dupont may also be used.

In some embodiments, asymmetric flat sheet membranes which are currently used in very high quantity for water purification applications (see U.S. Patent Publication No. 2014/0290478) may be used. These membranes are generally polysulfone or polyethersulfone, and may be coated with perfluoropolymers or crosslinked silicone elastomer to increase chemical resistance. Also poly(vinylidene fluoride) and possibly polyimide asymmetric (porous) membranes may be used, for example, if chemical resistance is a problem. Some of the membranes may be used as is without coatings. Examples of such membranes include FilmTec® membranes (Dow Chemical, Midland, Mich. (USA)). These are porous polysulfone asymmetric membranes coated with a crosslinked high Tg polyamide (with a coating thickness of about 0.1 microns). The crosslinked polyamide coating should provide chemical resistance. Although the oxygen permeability of the polyamide is low, the thickness of the coating may be so low that the effective oxygen transmission rate is high. The polysulfone support without the polyamide layer could be coated with a wide variety of polymers such as silicone rubber (or AF-2400) to yield very high oxygen transmission. The FilmTec® membranes are produced in very high quantity as they are the prime material used in water desalination plants. PVDF porous membranes may allow repeated use.

Although embodiments according to the present invention are described with respect to flexible layers on the build plate that include a semipermeable (or gas permeable) member (e.g., perfluoropolymers, such as TEFLON AF® fluoropolymers, it should be understood that any suitable flexible material may be used in the configurations described herein. For example, a transparent, resilient paper, such as glassine, may be used. Glassine is a relatively transparent, greaseproof paper formed of well-hydrated cellulosic fibers that has been super calendared. Glassine may be plasticized and/or coated with wax or a glaze. Glassine may be gas permeable. In some embodiments, the glassine may be coated with a thin layer of crosslinked silicone elastomer or a perfluoropolymer, such as TEFLON AF® fluoropolymers. Glassine paper is substantially grease resistant, and may have limited adhesion to the polymerizable liquid described herein.

Build plate coatings. Omniphobic surfaces may be used on the build plate surface or build region. For example, patterned surfaces (either a random array of particles or micro-patterned surfaces) that contain non-miscible fluids that are pinned or held to the surface by capillary forces may be used. Such a surface may result in fluid on the surface floating along the surface. Examples of such surfaces are described in U.S. Pat. Nos. 8,535,779 and 8,574,704, the disclosures of which are hereby incorporated by reference in their entireties.

Examples of build plates that can be modified based on the disclosure given herein for use in carrying out the present invention include, but are not limited to, those described in: U.S. Pat. No. 9,498,920 to J. DeSimone, A. Ermoshkin, and E. Samulski; U.S. Pat. No. 9,360,757 to J. DeSimone, A. Ermoshkin, N. Ermoshkin and E. Samulski; and U.S. Pat. No. 9,205,601 to J. DeSimone, A. Ermoshkin, N. Ermoshkin and E. Samulski; U.S. Patent Application Publication Nos. 2016/0046075 to J. DeSimone, A. Ermoshkin et al.; 2016/0193786 to D. Moore, A. Ermoshkin et al.; 2016/0200052 to D. Moore, J. Tumbleston et al.; PCT Patent Application Publication Nos. WO 2016/123499 to D. Moore, J. Tumbleston et al; WO 2016/123506 to D. Moore, J. Tumbleston et al.; WO 2016/149097 to J. Tumbleston, E. Samulski et al.; WO 2016/149014 to J. Tumbleston, E. Samulski et al.; and others (the disclosures of all of which are incorporated by reference herein in their entirety).

3. Example Products and Methods.

In general, embodiments of the present invention provide an additive manufacturing apparatus and resin window cassette for an additive manufacturing apparatus. Related methods of concurrently making a plurality of three-dimensional objects from a plurality of distinct light polymerizable resins are also provided. Embodiments of the present invention will now be discussed in greater detail with reference to FIGS. 1-11.

Figure 1:
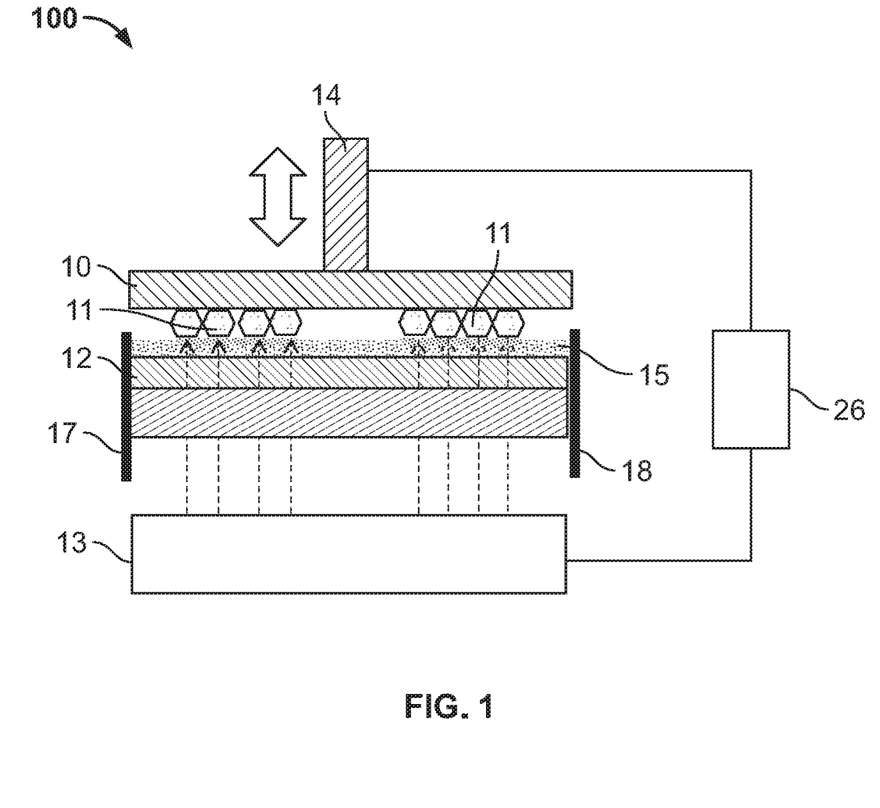
FIG. 1 illustrates an additive manufacturing apparatus for producing a three-dimensional object according to embodiments of the present invention.

Referring to FIG. 1, an additive manufacturing apparatus 100 according to embodiments of the present invention is illustrated. As shown in FIG. 1, the apparatus 100 may include a deck 17, a resin cassette 12 positioned on the deck 17, a light engine 13 (e.g., a UV light source) positioned beneath the deck 17, a drive assembly 14, and a carrier platform 10 positioned above the cassette 12. The carrier platform 10 may be positioned above the light engine 13. The drive assembly 14 may be operatively associated and/or connected with the deck 17 and carrier platform 10. The drive assembly 14 may be configured to advance the carrier platform 10 towards and away from the cassette 12. As will discussed in further detail below, a plurality of three-dimensional objects 11 (e.g., dental appliances) may be produced on the carrier platform 10 from one or more distinct light polymerizable resins 15.

Figure 2:
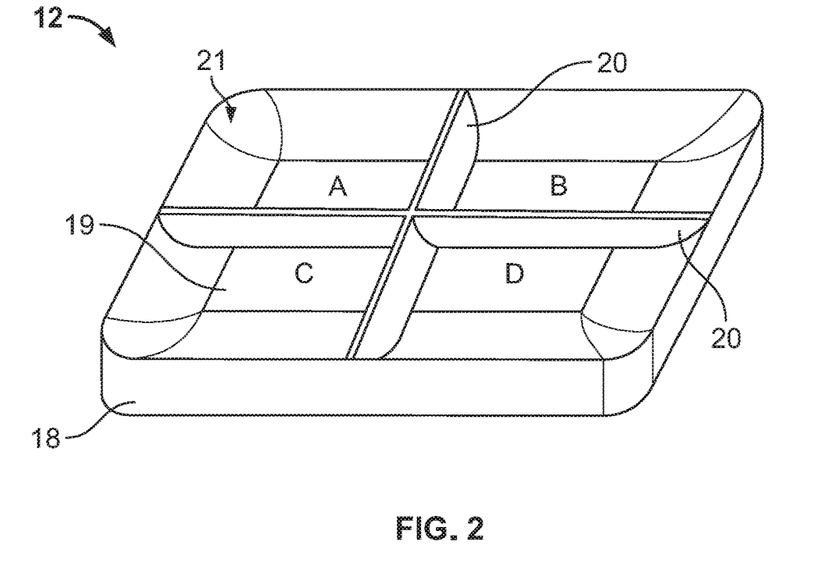
FIG. 2 illustrates a resin window cassette of the apparatus of FIG. 1 according to embodiments of the present invention.
Figure 3:
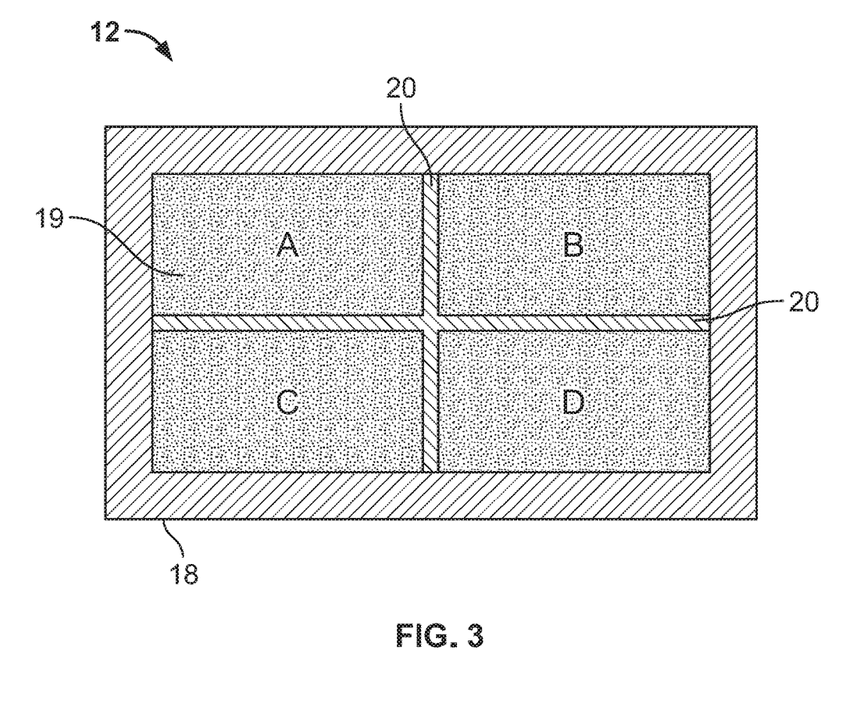
FIG. 3 is a top view of a cassette showing an exemplary configuration of the independent build regions for the resin cassette of FIG. 2 according to embodiments of the present invention.

Referring to FIG. 2 and FIG. 3, in some embodiments, the resin cassette 12 may comprise a light-transmissive window 19, a frame 18 connected to and surrounding the window 19, and at least one dam 20 connected to the frame 18. In some embodiments, the light engine 13 may be configured to project light through the light-transmissive window 19 of the cassette 12 (see, e.g., FIG. 1). In some embodiments, the frame 18 and light-transmissive window 19 of the cassette 12 together form a well 21 for receiving the one or more distinct light polymerizable resins 15. The at least one dam 20 may extend over the window 19 while continuously contacting the window 19 (see also, e.g., FIG. 9).

As shown in FIG. 2 and FIG. 3, the at least one dam 20 may be positioned within the well 20 of the cassette 12 such that the at least one dam 20 partitions the well 20 into a plurality of independent build regions A-D (see also, e.g., FIGS. 5-8). For example, as shown in FIG. 2, the cassette 12 may comprise two dams 20 that partition the well 20 into four independent build regions A, B, C, D. In general, the at least one dam 20 divides the cassette 12 into multiple individual mini-cassettes (i.e., build regions A-D) without inhibiting the critical functioning of the window 19 or the light engine 13.

The dam(s) 20 partition the cassette 12 (shown in FIG. 2 as a four section cassette 12) creating a grid of mini-cassettes (build regions A-D) which each individually function the same as the larger cassette 12. In some embodiments, the at least one dam 20 is removably connected to the frame 18 of the cassette 12. In other embodiments, the at least one dam 20 is permanently fixed to the frame 18 of the cassette 12.

The cassette 12 can incorporate more partitions (i.e., dams 20) as long as the window 19 of the cassette 12 remains permeable to oxygen and the one or more polymerizable resins 15 received in each build region A-D remain physically isolated from each other. As shown in FIGS. 2-6, according to embodiments of the present invention, the well 20 of the cassette 12 may be partitioned by the dam(s) 20 into any number of build regions A-D and in a variety of different configurations. For example, the cassette 12 may have 2, 3, 4, 5, 6, 7, 8 or more independent build regions A-D. In some embodiments, the independent build regions A-D may be symmetric within the well 20 (see, e.g., FIGS. 3, 4, and 6). In other embodiments, the independent build regions A-D may be asymmetric within the well 20 (see, e.g., FIG. 5).

Figure 4:
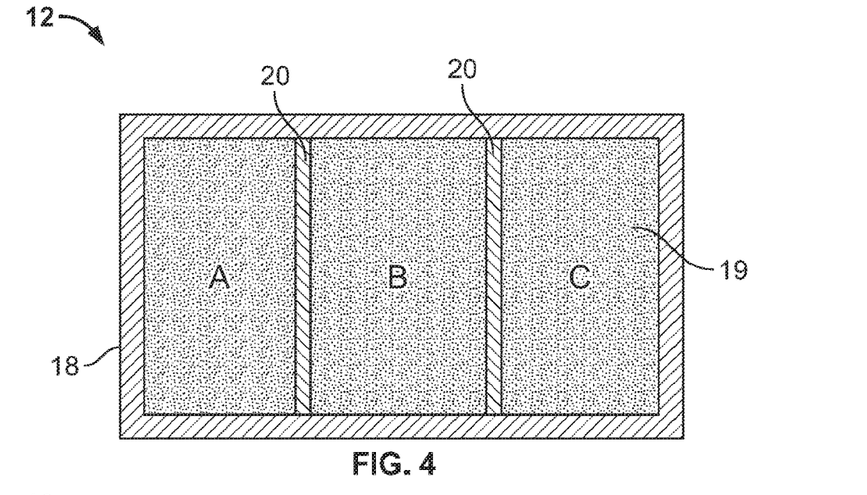
FIG. 4 is a top view of a cassette showing another exemplary configuration of the independent build regions for the resin cassette of FIG. 2 according to embodiments of the present invention.
Figure 5:
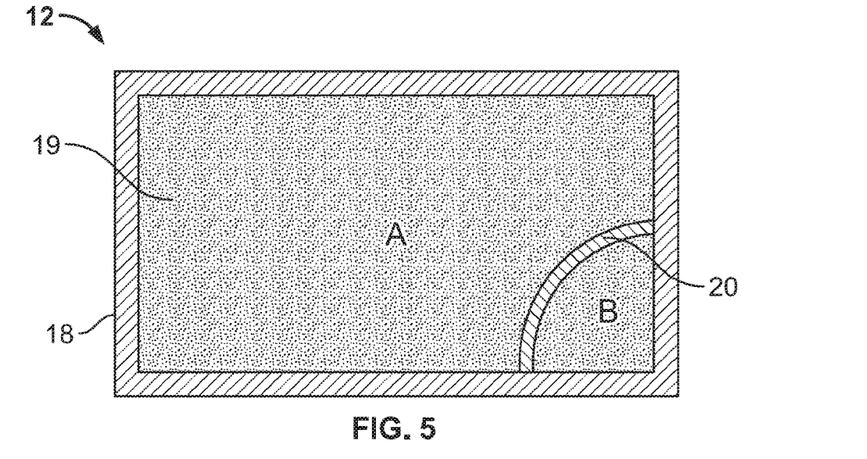
FIG. 5 is a top view of a cassette showing another exemplary configuration of the independent build regions for the resin cassette of FIG. 2 according to embodiments of the present invention.
Figure 6:
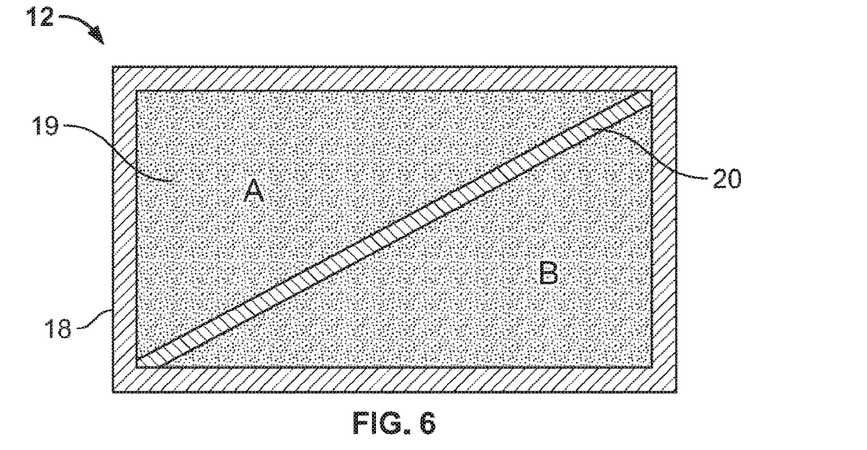
FIG. 6 is a bottom view of a cassette showing another exemplary configuration of the independent build regions for the resin cassette of FIG. 2 according to embodiments of the present invention.

As shown in FIG. 4, in some embodiments, the well 20 may be partitioned into three rectangular build regions A-C. As shown in FIG. 5, in some embodiments, the well 20 may be partitioned into two build regions A, B, where one of the build regions (i.e., build region B) occupies a corner of the well 20 and the other build region (i.e., build region A) occupies the remaining portion of the well 20. As shown in FIG. 6, in some embodiments, the well 20 may be partitioned diagonally into two build regions A, B. Again, these are only examples and the well 20 may be partitioned into any number or configuration of build regions A-D. In some embodiments, each independent build region A, B, C, D may be configured to receive the same or a different light polymerizable resin as one or more of the other build regions A, B, C, D.

Figure 7:
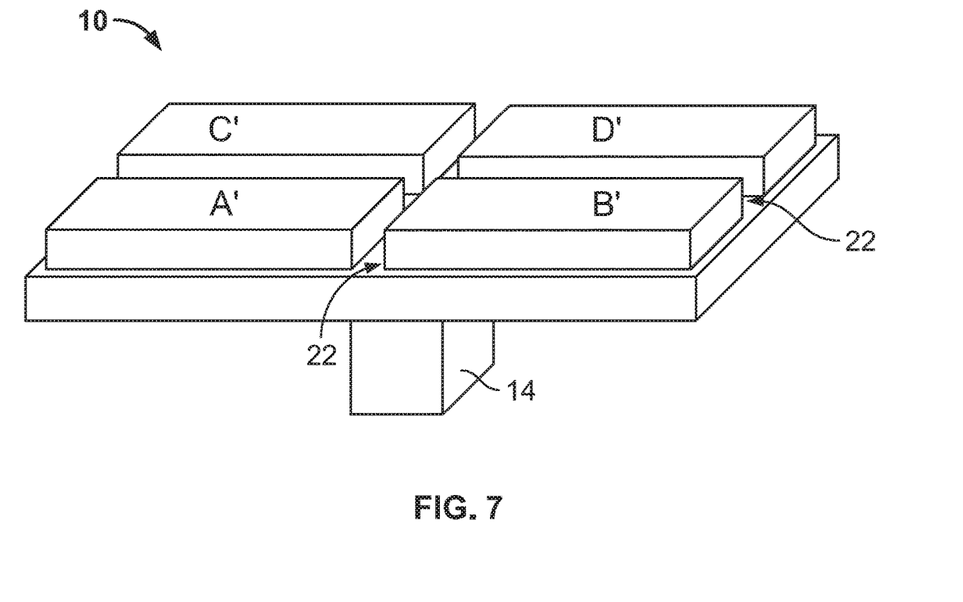
FIG. 7 illustrates a carrier platform of the apparatus of FIG. 1 according to embodiments of the present invention.

Referring now to FIG. 7, in some embodiments, the carrier platform 10 may comprise at least one channel 22 formed therein. For example, as shown in FIG. 7, in some embodiments, the carrier platform 10 may comprise two channels 22 formed therein. Similar to the at least one dam 20 of the cassette 12 discussed above, the at least one channel 22 may partition the carrier platform 10 into a plurality of independent build surfaces A', B', C', D'. In some embodiments, each channel 22 of the carrier platform 10 is configured to receive a corresponding dam 20 of the cassette 12 when the carrier platform 10 and the cassette 12 are advanced toward each other by the drive assembly 14 such that each build surface A'-D' of the carrier platform 10 is received within a respective build region A-D of the cassette 12.

Figure 8:
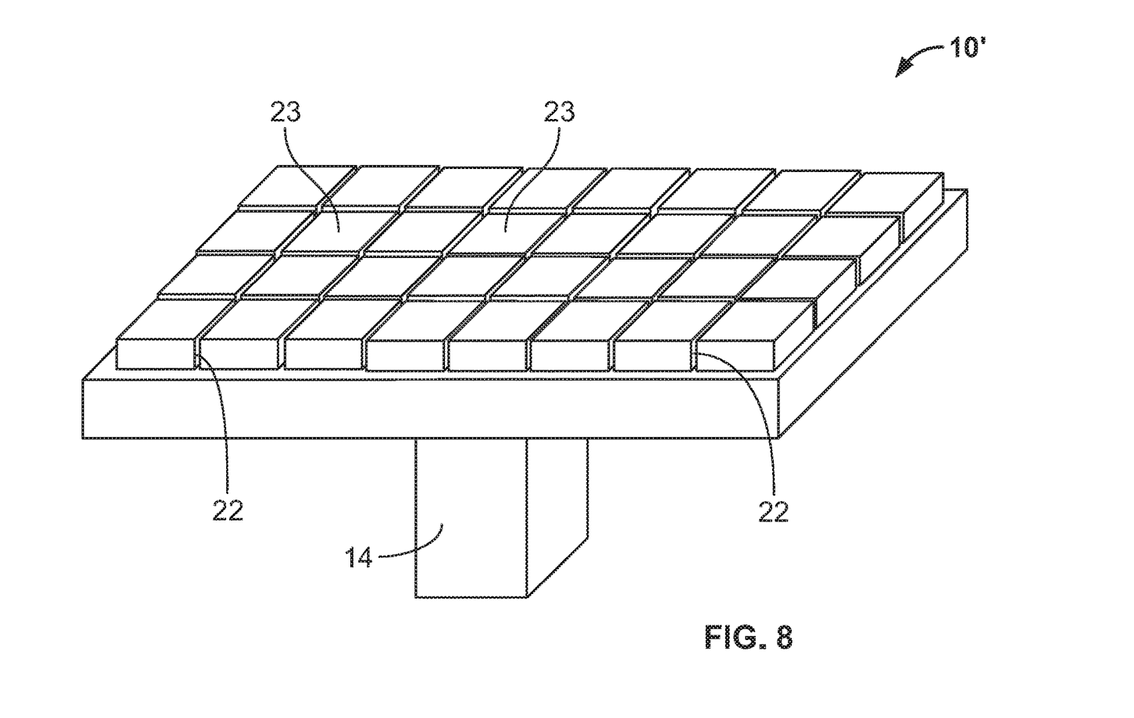
FIG. 8 illustrates an alternative carrier platform having independently adjustable build surfaces according to embodiments of the present invention.

Referring to FIG. 8, an alternative carrier platform 10' of the present invention is illustrated. As shown in FIG. 8, in some embodiments, the carrier platform 10' may comprise a plurality of build segments 23. The build segments 23 may be independently addressable. For example, the build segments 23 may be independently removable from or retractable within (e.g., spring-loaded or a similar mechanism) the carrier platform 10'. The build segments 23 may be configured such that as the independently addressable build segments 23 are removed or retracted, the position of the at least one channel 22 is adjusted. For example, in some embodiments, one or more build segments 23 may be removed or retracted to form a channel 22 in the carrier platform 10' in a position that corresponds to the position of a respective dam 20 of the cassette 12. The ability to adjust the channel(s) 22 within the carrier platform 10' allows the carrier platform 10' to be used with different resin cassette 12 having the dam(s) 20 positioned in different locations on the cassette 12 (i.e., cassettes 12 having different build region A-D configurations).

Figure 9:
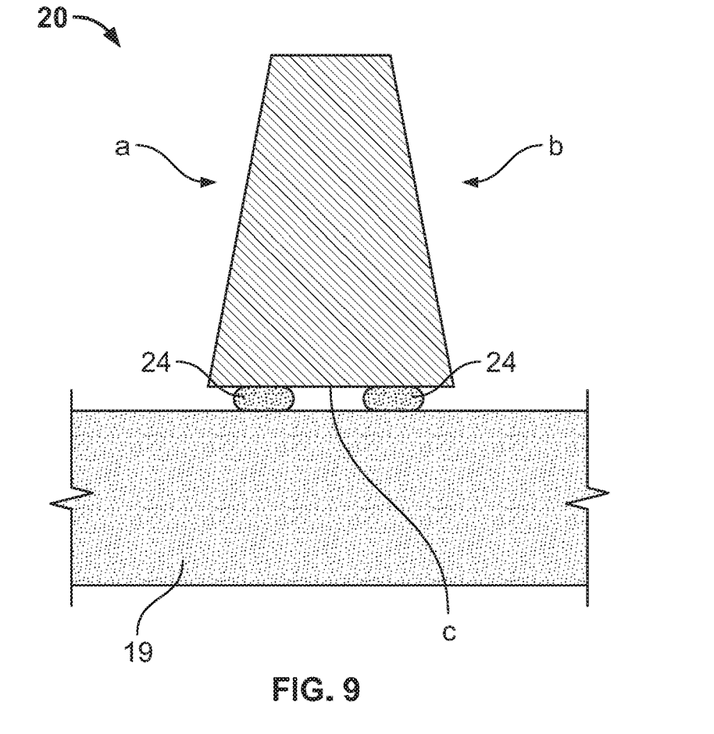
FIG. 9 is a side view of a dam according to embodiments of the present invention.

Referring to FIG. 9, in some embodiments, the at least one dam 20 of the cassette 12 may include opposing sidewall portions (a, b) and a bottom portion (c). The sidewall portions (a, b) of the dam 20 may be contoured to ensure that each "mini-cassette" may function like the original cassette 12. For example, as shown in FIG. 9, in some embodiments, the opposing sidewalls portions (a, b) of the dam 20 may be tapered. In some embodiments, a resilient gasket 24 may be coupled or connected to the bottom portion (c) of the dam 20. In some embodiments, the gasket 24 may be configured to seal the at least one dam 20 to the light transmissive window 19 of the cassette 12.

Figure 10A:
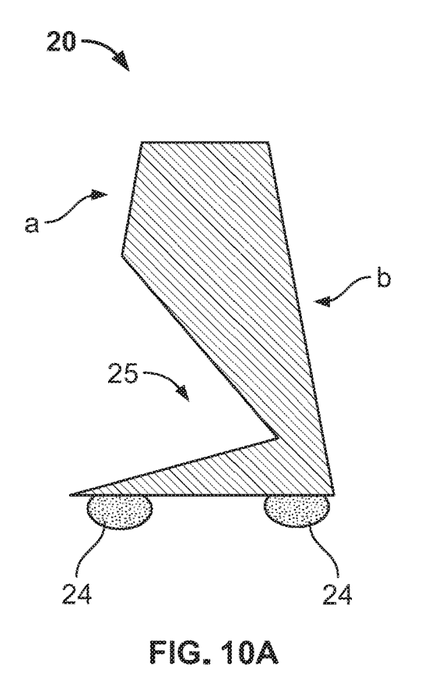
FIG. 10A is side view of a dam having a plurality of recesses according to embodiments of the present invention.
Figure 10B:
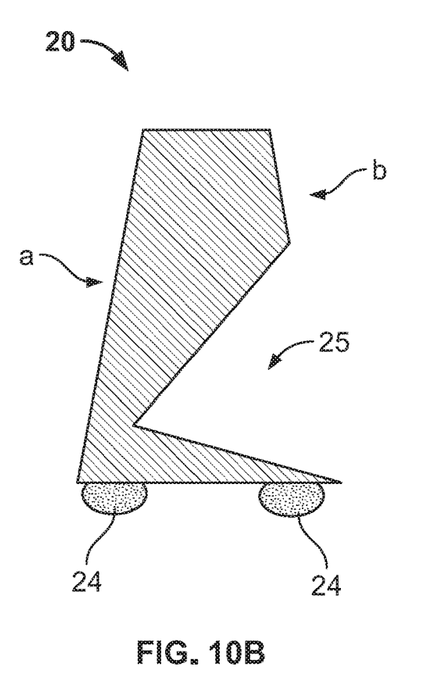
FIG. 10B is an opposite side view of the dam of FIG. 10A illustrating the interleaved recesses according to embodiments of the present invention.

Referring to FIG. 10A and FIG. 10B, in some embodiments, each sidewall portion (a, b) of the at least one dam 20 may comprise a plurality of recesses 25 formed therein. The recesses 25 may be configured to receive the light polymerizable resin 15 therein and may help to facilitate the flow of the resin 15 from the dam 20 onto the light-transmissive window 19. In some embodiments, the recesses 25 of one sidewall portion (a) are interleaved (or interdigitated) with the recesses 25 of the opposing sidewall portion (b) such that recesses 25 alternate from one sidewall portion (a) to the other sidewall portion (b) of the dam 20.

Methods of concurrently making a plurality of three-dimensional objects 11 are also provided. In some embodiments, the plurality of three-dimensional objects 11 is made from a plurality of distinct light polymerizable resins 15. In some embodiments, a method of concurrently making a plurality of three-dimensional objects 11 may include (i) filling at least two build regions A, B of an additive manufacturing apparatus 100 according to embodiments of the present invention with a different light polymerizable resin 15 in each build region A, B; and then (ii) concurrently producing at least one three-dimensional object 11 from each light polymerizable resin 15 on a respective independent build surface A', B' on the carrier platform 10.

In some embodiments, the different light polymerizable resins 15 differ from each other in pigment content. In some embodiments, the different light polymerizable resins 15 are similar to each other in monomer and/or prepolymer content. Optionally, but preferably in some embodiments, the different light polymerizable resins 15 may be similar to each other in catalyst and/or filler content.

In some embodiments, the additive manufacturing apparatus 100 of the present invention may further comprise a controller 26 (see, e.g., FIG. 1). The controller 26 may be operatively associated with the light engine 13 and the drive assembly 14. The controller 26 may be local, remote (e.g., on the cloud), or distributed across both local and remote locations.

In some embodiments, methods of the present invention may further comprise identifying the position of the at least one dam 20 and/or the plurality of independent build regions A-D in the frame 18. For example, the positions may be identified by optically identifying the position of at least one dam 20 with the aid of a camera (not shown). The camera may be operatively associated with the controller 26. The positions may be identified by manually entering the position of the at least one dam 20 into the controller 26 with a keyboard, touch screen, or other user interface (not shown). The positions may be identified by electromechanically sensing the position of the at least one dam 26 with sensors (not shown) on the frame 18. The sensors may be operatively associated with the controller 26. For a resin cassette 12 with a permanent dam 20 and a unique identifier (such as an NFC tag associated with the cassette 12), the positions may be identified by a unique identifier reader.

In some embodiments, at least one of the different polymerizable resins 15 has a dose to cure (DC) different from the other different resins 15. In some embodiments, the controller 26 is configured to modify the light dose (e.g., from the light engine 13) to at least one of build regions A-D based on the different DC for the particular resin 15 in that particular build region A-D. For example, with build regions A-D containing polymerizable resins 15 that have a higher DC receiving a more intense and/or longer light exposure from the light engine 13 and build regions A-D containing polymerizable resins 15 that have a lower DC receiving a less intense and/or shorter light exposure from the light engine 13.

Figure 11:
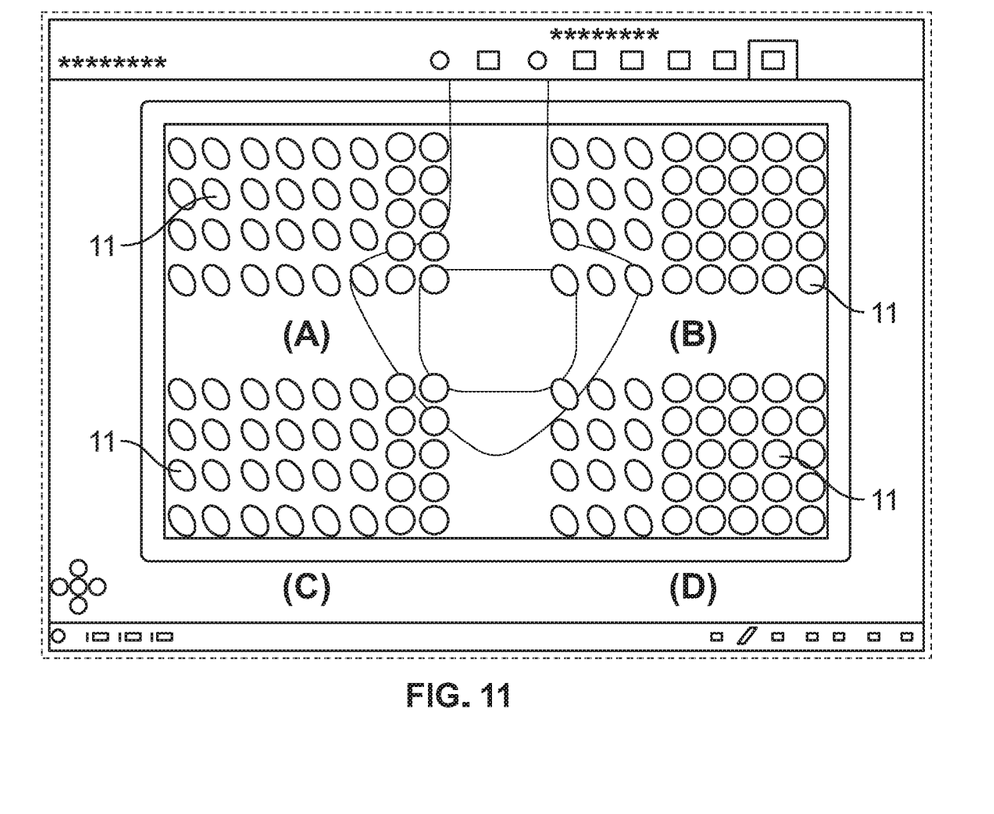
FIG. 11 is a screenshot from a computer monitor illustrating an exemplary initial setup to produce multiple three-dimensional objects in four independent build regions using an additive manufacturing apparatus according to embodiments of the present invention.

In some embodiments, a set of three-dimensional objects 11 defined by at least one print file may be produced in each of the independent build regions A-D (see, e.g., FIG. 11). In some embodiments, a method may further comprise independently saving the at least one print file associated with each of the independent build regions A-D. This allows subsequent manufacturing of the three-dimensional objects 11 without the necessity of reproducing the objects in other build regions A-D, for example, if the three-dimensional objects 11 from one of the build regions A-D are defective.

In some embodiments, a method may further comprise providing a data file for a plurality of three-dimensional objects 11. In some embodiments, the data file is a three-dimensional printable file format file (e.g., STL format file). In some embodiments, each of the plurality of objects 11 may have a unique identifier indicating which of the different polymerizable resins 15 should be used to produce each respective plurality of objects 11.

In some embodiments, the method further comprises assigning each plurality of three-dimensional objects 11 to one of the build regions A-D based on their unique identifier. This assignment may be made automatically in the controller 26. For example, where teeth, crowns, or other dental implants are to be produced by the additive manufacturing apparatus 100, and the different objects 11 have different colors or shades, this assigning feature can "auto nest" a group of objects 11 to the appropriate build region A-D containing the appropriate polymerizable resin 15 for all of the objects 11 in that group.

FIG. 11 is a screenshot from a computer monitor illustrating an exemplary initial setup to produce a plurality of three-dimensional objects 11 in four independent build regions A-D using an additive manufacturing apparatus 100 according to embodiments of the present invention. As shown in FIG. 11, in some embodiments, the additive manufacturing apparatus 100 of the present invention may simultaneously produce up to 128 total units in four different pigment shades (i.e., 32 units in each shade in each build region A-D).

The above described apparatuses and methods may be used to manufacturing a variety of different dental appliances, including, but not limited to, dental crowns, dental bridges, denture bases, denture teeth in single unit or bridged construction, implant retained/implant supported bars and superstructures, partial denture frameworks, night guards and splints, and any associated dental models or ancillary components such as surgical guides, soft tissue models, implant abutment replicas, custom trays, or any combination thereof. These are examples only and any number of other three-dimensional objects can be formed using the methods and materials described herein.

For example, in some embodiments, the three-dimensional objects 11 produced using apparatuses and/or methods of the present invention may comprise dental crowns, dental bridges, or a combination of dental crowns and dental bridges, denture bases, or a combination of dental crowns, dental bridges and denture bases. In some embodiments, a plurality of dental crowns and/or bridges may be produced in each build region A-D. In some embodiments, the dental crowns and/or dental bridges of each build region A-D differ in pigment content from the dental crowns and/or dental bridges in the other build regions A-D.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A resin cassette for an additive manufacturing apparatus, comprising:
   (a) a light-transmissive window;
   (b) a frame connected to and surrounding said window, the frame with said window defining a well; and
   (c) at least one dam connected to said frame, extending over said window, and continuously contacting said window, the at least one dam partitioning said well into a plurality of independent build regions, said independent build regions configured for receiving different light polymerizable resins from one another,
   wherein said at least one dam includes opposing sidewall portions and a bottom portion, said bottom portion having a resilient gasket connected thereto, said gasket configured for sealing said at least one dam to said window, and
   wherein each sidewall portion has a plurality of recesses formed therein, said recesses configured to receive light polymerizable resin therein and facilitate the flow of resin onto said window therefrom, with the recesses of each sidewall portion interleaved with the recesses of the opposing sidewall portion.

2. The cassette of claim 1, wherein said at least one dam is removably connected to or permanently fixed to said frame.

3. The cassette of claim 1, wherein said independent build regions are symmetric or asymmetric.

4. The cassette of claim 1, wherein said plurality of independent build regions consists of from two or three to six or eight independent build regions.

5. An additive manufacturing apparatus, comprising:
   (a) a deck;
   (b) a resin cassette positioned on said deck, the resin cassette comprising:
      a light-transmissive window;
      a frame connected to and surround said window, the frame with said window defining a well; and
      at least one dam connected to said frame, extending over said window, and continuously contacting said window, the at least one dam partitioning said well into a plurality of independent build regions, said independent build regions configured for receiving different light polymerizable resins from one another,
      wherein said at least one dam includes opposing sidewall portions and a bottom portion, said bottom portion having a resilient gasket connected thereto, said gasket configured for sealing said at least one dam to said window;
   (c) a light engine positioned beneath said deck and configured for projecting light through said light-transmissive window;
   (d) a drive assembly operatively associated with said deck; and
   (e) a carrier platform connected to said drive assembly and positioned above said resin cassette, said carrier platform having at least one channel formed therein, said at least one channel configured to received said at least one dam when said carrier platform and said light-transmissive window are advanced towards one another such that said carrier platform is partitioned into a plurality of independent build surfaces corresponding to said plurality of independent build regions.

6. The apparatus of claim 5, wherein said carrier platform comprises a plurality of independently addressable, removable or retractable, build segments configured such that said at least one channel is adjustable to correspond to the position of said at least one dam.

7. A method of concurrently making a plurality of three-dimensional objects from a plurality of distinct light polymerizable resins, comprising:
   (a) providing an additive manufacturing apparatus, said additive manufacturing apparatus comprising:
      a deck,
      a resin cassette positioned on said deck, the resin cassette comprising:
         a light-transmissive window;
         a frame connected to and surround said window, the frame with said window defining a well; and
         at least one dam connected to said frame, extending over said window, and continuously contacting said window, the at least one dam partitioning said well into a plurality of independent build regions, said independent build regions configured for receiving different light polymerizable resins from one another,
         wherein said at least one dam includes opposing sidewall portions and a bottom portion, said bottom portion having a resilient gasket connected thereto, said gasket configured for sealing said at least one dam to said window;
      a light engine positioned beneath said deck and configured for projecting light through said light-transmissive window;

a drive assembly operatively associated with said deck; and a carrier platform connected to said drive assembly and positioned above said resin cassette, said carrier platform having at least one channel formed therein, said at least one channel configured to received said at least one dam when said carrier platform and said light-transmissive window are advanced towards one another such that said carrier platform is partitioned into a plurality of independent build surfaces corresponding to said plurality of independent build regions, (b) filling at least two build regions of the additive manufacturing apparatus with a different resin in each build region; and then (c) concurrently producing at least one object from each of said resins on each of said independent build surfaces.

8. The method of claim 7, wherein said three-dimensional objects comprise:
 (i) dental crowns, dental bridges, or a combination thereof,
 (ii) denture bases, or
 (iii) a combination of (i) and (ii).

9. The method of claim 7, wherein said three-dimensional objects comprise dental appliances selected from a group consisting of dental crowns, dental bridges, denture bases, denture teeth in single unit or bridged construction, implant retained/implant supported bars and superstructures, partial denture frameworks, night guards and splints, and any dental models or ancillary components of the dental appliances including surgical guides, soft tissue models, implant abutment replicas, and custom trays.

10. The method of claim 7, wherein:
 (i) said different resins differ from one another in pigment content;
 (ii) said different resins are like one another in monomer and/or prepolymer content; and
 (iii) optionally, said different resins are like one another in catalyst and/or filler content.

11. The method of claim 7, wherein a plurality of dental crowns and/or bridges are produced in each build region, and wherein the dental crowns and/or bridges of each build region differ from those of the other build region in pigment content.

12. The method of claim 7, said apparatus further comprising a controller operatively associated with said light engine and said drive assembly, said method further comprising:
 identifying the position of said at least one dam and/or said plurality of independent build regions in said frame.

13. The method of claim 7, wherein at least one of said different resins has a dose to cure (DC) different from the others of said different resins, and said controller is configured to modify the light dose to at least one of build region based on said different DC for the resin in that build region.

14. The method of claim 7, wherein a set of three-dimensional objects defined by at least one print file is produced in each of said independent build regions, the method further comprising:
 independently saving the at least one print file associated with each of said independent build regions.

15. The method of claim 7, further comprising:
 providing a data file for a plurality of objects, each of said plurality of objects having a unique identifier indicating which of said different resins should be used to produce each three-dimensional object; and then
 assigning each said three-dimensional object to one of said build regions based on said unique identifier.

* * * * *

UNITED STATES PATENT AND TRADEMARK OFFICE
CERTIFICATE OF CORRECTION

| | |
|---|---|
| PATENT NO. | : 11,518,098 B2 |
| APPLICATION NO. | : 17/597656 |
| DATED | : December 6, 2022 |
| INVENTOR(S) | : Iain A. McFarlane |

It is certified that error appears in the above-identified patent and that said Letters Patent is hereby corrected as shown below:

In the Claims

Column 14, Lines 2-3, Claim 4: Please correct "from two or three to six or eight" to read --from two to eight--

Signed and Sealed this
Fourteenth Day of March, 2023

Katherine Kelly Vidal
*Director of the United States Patent and Trademark Office*